Patented Nov. 4, 1952

2,616,862

UNITED STATES PATENT OFFICE 2,616,862

PHONOGRAPH RECORDS AND MOLDING COMPOSITIONS

Joseph W. Ayers, Easton, Pa., assignor to Agrashell, Inc., a corporation of Delaware No Drawing. Application June 25, 1948, Serial No. 35,282

18 Claims. (Cl. 260—17.4)

This invention relates to phonograph records of novel properties and to molding compositions from which such records are produced. As to the latter, it more particularly relates to filled, resin-base molding compositions capable of producing high grade sound-reproducing records of the flexible or so-called non-breakable type.

At the present time, most of the phonograph records produced are of the rigid, breakable shellac base type. These records are cheap to produce because of the low cost of shellac and because such records ordinarily contain approximately 70% by weight of cheap fillers. Flexible records manufactured from synthetic resins, such as vinyl resins, have replaced in part the shellac base records because of their superior durability, resistance to breakage, non-inflammability and other desirable properties. The extension of use of vinyl base records has been limited and retarded because of a number of adverse factors including their higher cost due to the higher price paid for vinyl resins than normally paid for shellac, the greater expense connected with the molding of flawless records and the practical necessity for compounding the flexible records from unextended or unfilled vinyl resins.

The ultimate object of the present invention is to provide flexible sound-reproducing or phonograph records having desirable qualities of reproducibility, long playing life, a minimum of interference from surface noises and particularly records having mechanical properties of firmness, rigidity and resistance to fracture over a wide range of temperatures.

An intermediate object is to provide phonograph record molding compositions which, though extended or filled with substantial amounts of low cost materials, possess highly satisfactory commercial pressing or molding properties and at the same time are capable of providing pressed flexible records free of permanent warping tendencies in hot climates, which warping may occur if the records have been subjected to accidental or unavoidable stress or strain in a heated condition. This warping property is measured in a test known as "cold flow" and is described later herein.

In my copending application, Serial Number 788,647, filed November 28, 1947, now Patent No. 2,572,798 issued October 23, 1951 I describe and claim phonograph record molding compositions and flexible records composed of vinyl resins, fine particle size ligno-cellulose fillers, plasticizers and other ingredients including elastomers, lubricants and coloring agents. These products have commercially desirable properties, the molding composition being easily compressed or molded and the finished records being excellent as to freedom from interference from surface noises, reproducibility, long playing life and resistance to fracture.

The described highly filled records require so much plasticizer for imparting desired pressing qualities that they may not meet the most rigid commercial requirements as to cold flow. A more limited object of the present invention is to reduce the cold flow properties of these plasticized, highly filled, vinyl base records.

Phonograph record molding compositions primarily contemplated by the present invention are composed of a vinyl resin base, a substantial amount of a very finely divided hard, ligno-cellulose filler, of which walnut shell flour is an example, a plasticizer, and a limited or small quantity of any one of a number of compounds or materials found by the applicant to reduce the cold flow of records produced therefrom. Such compounds are precipitated calcium silicate, precipitated silica, aluminum hydrate, and reinforcing clays. These compounds or materials may be referred to as "stiffening agents" and to accomplish this function they, surprisingly, must be very fine in particle size, that is they must not have a maximum average particle diameter greater than 5 microns and preferably a diameter in the range of 0.1 micron. Complete freedom from particles larger than about 45 microns is desirable in view of the noise characteristics which ordinarily would be imparted to the records produced from compositions containing the same. The amount of stiffening agent required depends, of course, on a number of obvious factors, as the nature of the resin base and of the extender as well as the proportions thereof employed, but in addition it depends upon the particular stiffening agent used. In general it may be stated, however, that the amount of the stiffening agent never need be more than 20% by volume. Usually 10% by volume of the least efficient of the stiffening agents is sufficient to reduce the cold flow of the records produced from the molding composition to a value within commercially desirable limits. Somewhat less than 1% by volume of the more efficient stiffening agents is adequate.

The invention contemplates molding compositions and records containing any suitable vinyl resin base, a number of said bases being defined in the literature. A preferred vinyl resin base is one obtained by the cold polymerization of a vinyl halide with an oxygen-containing vinyl compound of which vinyl acetate is an example. Mixtures containing 30% or less of the vinyl ester and 70% or more of the vinyl halide produce very acceptable results in the making of high quality records. Other resins which may alternatively be employed are, for example, vinyl acetate, polyvinyl chloride, vinylidene chloride, polyvinyl vinylidene chloride and vinyl butyrate.

The ligno-cellulose extenders preferably used in the compositions and records of the present invention are hard, dense, non-absorbent, non-fibrous, natural vegetable shell materials containing at least 45% by weight of combined pentosans, hexosans and lignins. They are preferably employed in amounts of from 35% to 60% by weight, but amounts as low as 20% can be used to advantage in the compositions. The materials contemplated include endocarps as the shells of English walnuts, black walnuts, pecans, Brazil nuts, cocoanuts and the like; also the pits of apricots, olives, dates, peaches and the like and also certain hard, dense, non-fibrous barks of a number of trees. The ligno-cellulose extender used in the composition must be of very fine particle size to obtain acceptable results, i. e., the particles should all be smaller than 30 microns and at least 90% of the same should be smaller than 25 microns. When in this fine condition, 40% by volume may be added to the composition without perceptibly increasing the surface noise level of the records produced from it, or to a degree as high as that of the best prior filled commercial records. The extender contributes dimensional stability, greater faithfulness of reproduction, increased wear resistance, improved processing features and a lowering of the cost of the composition.

The molding compositions of the present invention containing large amounts of the ligno-cellulose extender may be plasticized by the addition of the desired amount of any of the known plasticizers, such for example as phthalic esters, chlorinated diphenyl derivatives, tricresyl derivatives, halogenated naphthalene derivatives, glycol esters and linear high molecular weight polyester resins prepared by the reaction of a dibasic acid with a dihydric aliphatic alcohol having plasticizing properties.

The molding compositions and records of the present invention contain not only the vinyl resin base, the ligno-cellulose filler, the plasticizer and the stiffening agent, but also they may contain reinforcing elastomers, extender resins, as well as other compounding ingredients commonly employed, such as lubricants, stabilizers, antioxidants and coloring agents.

The hereinbefore mentioned cold flow property is measured by an accelerated laboratory test involving the molding of test strips from the composition to be tested for cold flow to a standard dimension of 4 inches by 1 inch by .080 inch. The test strips are supported upon two knife edges three inches apart and a load of 1000 g. is placed in the middle and across the strip. The weighted strip is then placed in an oven heated to 100° F. and held there for one hour after which the load is removed from the strip and the strip is withdrawn from the oven. After a rest period of fifteen minutes, the strip is tested for permanent distortion or curvature by placing the ends of the test strip on a straight line and measuring the distance between this line and the center of the strip, the amount of distortion being reported in millimeters. Strips which show, on testing, a distortion or curvature of from 20 to 30 millimeters are considered to have a high cold flow or to respond poorly to the cold flow test. Record strips showing a curvature of 4 millimeters or less are considered to exhibit excellent resistance to cold flow. Compositions testing not more than 5 millimeters meet the most rigid commercial requirements.

Molding compositions of the present invention are illustrated in the following examples:

Example 1

| | Parts by weight |
|---|---|
| Vinyl chloride-acetate resin | 50 |
| Lead stearate | 1 |
| Carnauba wax | .5 |
| Ligno-cellulose extender | 35.43 |
| Precipitated calcium silicate | 7.76 |
| Plasticizer | 4.85 |
| Dioctyl phthalate | 1.40 |
| Color | 1 |
| Wetting agent | .25 |

On test the foregoing composition exhibited a cold flow of four millimeters.

A composition similar to the above in which none of the ligno-cellulose extender was replaced by the precipitated calcium silicate exhibited on test a cold flow of about 18 millimeters.

Example 2

| | Parts by weight |
|---|---|
| Vinyl chloride-acetate resin | 60 |
| Lead stearate | 1 |
| Wax | .5 |
| Ligno-cellulose extender | 28.21 |
| Precipitated calcium silicate | 4.72 |
| Dioctyl phthalate | 1.40 |
| Plasticizer | 4.60 |
| Color | 1 |
| Wetting agent | .25 |

In the foregoing example the amount of ligno-cellulose extender and also the amount of precipitated calcium silicate are substantially less than in Example 1. On test this composition exhibited a cold flow of only 2 millimeters.

A composition having proportions the same as above in which none of the ligno-cellulose extender was replaced by precipitated calcium silicate exhibited a cold flow of about 15 millimeters.

Example 3

| | Parts by weight |
|---|---|
| Vinyl chloride-acetate resin | 55 |
| Lead stearate | 1 |
| Carnauba wax | .5 |
| Ligno-cellulose extender | 35.91 |
| Dioctyl phthalate | 1.40 |
| Plasticizer | 4.35 |
| Precipitated silicon dioxide | 2.5 |
| Color | 1 |
| Wetting agent | .25 |

The moderate amount of precipitated silicon dioxide stiffens the compound to a remarkable degree.

Example 4

| | Parts by weight |
|---|---|
| Vinyl chloride-acetate resin | 55 |
| Lead stearate | 1 |
| Carnauba wax | .5 |
| Ligno-cellulose extender | 36.91 |
| Dioctyl phthalate | 1.40 |
| Plasticizer | 4.35 |
| Aluminum hydrate | 1.5 |
| Color | 1 |
| Wetting agent | .25 |

The aluminum hydrate employed in this example, though present in a very small amount, is most effective as a stiffening agent and reduces the cold flow to an acceptable degree. In other compositions, larger amounts may be required, as up to 5%.

The incorporation of the stiffening agents in the compositions of the present invention as illustrated in the foregoing examples do not render the records produced therefrom brittle or mechanically weak, nor do they increase the noise level.

Record compositions containing reinforcing clays as stiffening agents have been found effective in reducing the cold flow, but they are not as satisfactory as those containing the stiffening agents of the foregoing examples, for this agent ordinarily has an adverse effect upon the surface noise of the phonograph records containing it.

The molding compositions of the invention may be compounded in conventional equipment and in the conventional manner. However, the very fine particle size stiffening agents such as precipitated calcium silicate and precipitated silicon dioxide are very difficult to disperse in resins, and therefore in compounding them, it is desirable to prepare them first in the resin base and then to add the resulting homogeneous mixture in required amounts to the other ingredients of the formula as they are mixed together.

The compositions after being worked into a homogeneous mass at a suitable elevated temperature such as about 270° C. may be cut a number of times with a doctor blade and formed into biscuits in conventional manner. Thereafter the biscuits may be molded or pressed at temperatures in the neighborhood of 230° F. or higher and under a pressure of from 1500 to 4000 pounds per square inch depending upon the type and size of the record to be produced. Steam heating for a period of a few seconds at a stamper temperature of 270° F. is usually sufficient, after which cool water is applied to the die for thirty seconds or more depending upon the temperature of the cooling water used. These pressing conditions and the pressing cycle are well within industrial requirements.

The molded records do not contain entrapped air bubbles and hence the percentage of imperfect and rejected records is much less than when ordinary vinylite compositions are pressed. The flash from the pressing operation is rippled and can be removed easily by hand, which advantage is in strong contrast to the tough, horny flash formed when vinylite alone is pressed. The scrap and trimmings from the pressing operation may be reused without difficulty, which again is in contrast with the problems of recovering pure vinylite scrap.

The present invention, which has heretofore been disclosed as being applicable primarily to the production of vinyl base records and record compositions, also contemplates in its broader aspects the production of molding compositions and molded products having bases of other resins definable as phonograph record resin base materials. These bases in general may be defined further as those resins having a modulus of elasticity not greater than 6 and a compressive strength not greater than 19,000. Within this definition there may be mentioned the following resins and resin-like molding compositions hereinafter referred to collectively as "resinous molding materials":

Acrylate
Nylon
Styrene
Vinyl
Cellulose nitrate
Ethyl cellulose
Cellulose acetate
Cellulose butyrate As to the manner of performance of the herein disclosed stiffening agents, it can be said merely that they change the rheological properties of the herein described flexible or non-rigid resin compositions. Just why these agents reduce the plastic flow of the compositions of records under the conditions of the cold flow test is not understood, for the many other compounds and substances similar to the disclosed agents in physical and chemical properties were, on test, found not capable of serving the stiffening function. The action of the stiffening agent being upon the resinous molding materials, the present invention contemplates broadly combinations of these two materials irrespective of the presence of other ingredients such as extenders and plasticizers commonly employed in record molding compositions.

It should be understood that the present invention is not limited to the specific details herein given but that it extends to all equivalent material and procedures which will occur to those skilled in the art upon consideration of the claims appended hereto. The amounts of the components specified in the claims are by volume.

I claim:

1. Molding compositions capable of producing cold flow-resistant molded products composed of a moldable mass containing a resinous molding material having a modulus of elasticity not greater than 6 and a compressive strength not greater than 19,000, said mass not having by itself the property of producing cold flow-resistant molded products, in combination with a finely divided ligno-cellulose filler the particles of which are not more than 30 microns in diameter, and about 1 to 10% of a stiffening agent selected from the group consisting of precipitated calcium silicate, precipitated silica, aluminum hydrate, and reinforcing clays, the said agent having a maximum average particle diameter of not greater than 5 microns.

2. Molding compositions composed of a phonograph record vinyl resin base and a finely divided ligno-cellulose filler the particles of which are not more than 30 microns in diameter, said base having its capability of producing cold flow-resistant molded records enhanced by the addition of about 1 to 10% of a stiffening agent selected from the group consisting of precipitated calcium silicate, precipitated silica, aluminum hydrate, and reinforcing clays, the said agent having a maximum average particle diameter of not greater than 5 microns.

3. Molding compositions composed of a resinous molding material having a modulus of elasticity not greater than 6 and a compressive strength not greater than 19,000 in combination with a ligno-cellulose filler, the particles of which are not more than 30 microns in diameter, and having its capability of producing cold flow-resistant molded records enhanced by the addition of from about 1% to about 10% of aluminum hydrate, as a stiffening agent, the said agent having a maximum average particle diameter of not greater than 5 microns.

4. A cold flow-resistant phonograph record having a cold flow rating below 20 mm. and composed of a mixture of a resinous molding material having a modulus of elasticity not greater than 6 and a compressive strength not greater than 19,000, a finely divided ligno-cellulose filler the particles of which are not more than 30 microns in diameter and a plasticizer and containing in its structure about 1 to 10% of a stiffening agent selected from the group consisting of precipitated calcium silicate, precipitated silica, aluminum hydrate, and reinforcing clays, the said agent having a maximum average particle diameter of not greater than 5 microns, said mixture if molded without said agent having a property of producing records of cold flow resistance of a rating of not less than 20 mm.

5. A cold flow-resistant phonograph record having a cold flow rating below 20 mm. and composed of a vinyl resin, a ligno-cellulose filler the particles of which are not more than 30 microns in diameter and containing in its structure about 1 to 10% of a stiffening agent selected from the group consisting of precipitated calcium silicate, precipitated silica, aluminum hydrate, and reinforcing clays, the said agent having a maximum average particle diameter of not greater than 5 microns, said mixture if molded without said agent having a property of producing records of cold flow resistance of a rating of not less than 20 mm.

6. A cold flow-resistant phonograph record composed of a vinyl resin and a ligno-cellulose filler, the particles of which are not more than 30 microns in diameter and containing in its structure from about 1 to about 5% aluminum hydrate as a stiffening agent, the said agent having a maximum average particle diameter of not greater than 5 microns.

7. A phonograph record molding composition capable of producing molded products of a low cold flow rating below 20 mm. composed of a vinyl resin base, a finely divided ligno-cellulose filler of less than 30 micron particle size, a plasticizer and about 1 to 10% of a cold flow inhibiting agent selected from the group consisting of precipitated calcium silicate, precipitated silica, aluminum hydrate, and reinforcing clays, the said agent having a maximum average particle diameter of one-tenth micron, said compositions without said agent being capable of producing molded products only of a high cold flow rating of not less than 20 mm.

8. A phonograph record molding composition composed of a vinyl resin base, a finely divided ligno-cellulose filler the particles of which are not more than 30 microns in diameter, a plasticizer and about 1 to 10% of aluminum hydrate having a maximum average particle diameter of not greater than five microns, said aluminum hydrate being present in an amount which imparts cold flow resistance to said composition.

9. A phonograph record molding composition composed of a vinyl resin base, a finely divided ligno-cellulose filler of less than 30 micron particle size, a plasticizer and about 1 to 10% aluminum hydrate having a maximum average particle diameter of one-tenth micron, said aluminum hydrate being present in an amount which imparts cold flow resistance to said composition.

10. A phonograph record molding composition capable of producing molded products of a low cold flow rating below 20 mm. composed of a vinyl resin base, a finely divided ligno-cellulose filler containing at least 45% of combined pentosans, hexosans and lignins the particles of which filler are less than 30 microns in size, a plasticizer and about 1 to 10% of a cold flow inhibiting agent selected from the group consisting of precipitated calcium silicate, precipitated silica, aluminum hydrate, and reinforcing clays, the said agent having a maximum average particle diameter of not greater than five microns, said composition without said agent being capable of producing molded products only of a high cold flow rating of not less than 20 mm.

11. A phonograph record molding composition capable of producing molded products of a low cold flow rating below 20 mm. composed of a vinyl resin base, a finely divided ligno-cellulose filler containing at least 45% of combined pentosans, hexosans and lignins, the particles of which are not more than 30 microns in diameter and 90% of which are finer than 25 microns, a plasticizer and about 1 to 10% of a cold flow inhibiting agent selected from the group consisting of precipitated calcium silicate, precipitated silica, aluminum hydrate and reinforcing clays, the said agent having a maximum average particle diameter of not greater than five microns, said composition without said agent being capable of producing molded products only of a high cold flow rating of not less than 20 mm.

12. A phonograph record molding composition composed of a vinyl resin base, a finely divided ligno-cellulose filler containing at least 45% of combined pentosans, hexosans and lignins, the particles of which are not more than 30 microns in diameter and 90% of which are finer than 25 microns, a plasticizer and about 1 to 10% aluminum hydrate having a maximum average particle diameter of not greater than five microns, said aluminum hydrate being present in an amount which imparts cold flow resistance to said composition.

13. The process of reducing cold flow properties of molding compositions containing resinous molding materials having a modulus of elasticity not greater than 6, a compressive strength not greater than 19,000 and undesirable warping tendencies after being molded and also containing a finely divided ligno-cellulose the particles of which are not more than 30 microns in diameter, which consists of incorporating in such composition before molding from about 1 to 10% of a stiffening agent selected from the group consisting of precipitated calcium silicate, precipitated silica, aluminum hydrate, and reinforcing clays, the said agent having a maximum average particle diameter of not greater than 5 microns.

14. The process of imparting higher cold flow resistance to phonograph records producible from plasticized, ligno-cellulose filled, vinyl resin base, molding compositions of low cold flow-resistant properties, said filler being composed of particle sizes not larger than 30 microns, consisting of incorporating into said molding composition about 1 to 10% of a member of the group consisting of precipitated calcium silicate, precipitated silica, aluminum hydrate, and reinforcing clays, the said compounds having a maximum average particle diameter of not greater than five microns.

15. The process of imparting cold flow resistance to phonograph records producible from plasticized, vinyl resin base, molding compositions filled with ligno-cellulose material the particles of which are not more than 30 microns in diameter, consisting of incorporating into said molding composition about 1 to 10% of aluminum hydrate, the said compound having a maximum average particle diameter of not greater than five microns.

16. The process of imparting cold flow resistance to phonograph records producible from plasticized, vinyl resin base, molding compositions filled with ligno-cellulose material the particles of which are not more than 30 microns in diameter, consisting of incorporating into said molding composition about 1 to 10% of aluminum hydrate, the said compound having a maximum average particle diameter of one-tenth micron.

17. A vinyl resin base, phonograph record, molding composition consisting of a ligno-cellulosic filler the particles of which are not more than 30 microns in diameter, a plasticizer, said composition having hot plastic flow capable of being molded into records at a temperature of 270° stamper temperature at a pressure not in excess of 4000 pounds per square inch, the said records having a cold flow of not more than 5 millimeters imparted by the presence of about 1 to 10% of a stiffening agent selected from the group consisting of precipitated calcium silicate, precipitated silica, aluminum hydrate, and reinforcing clays, said agent having a maximum average particle diameter of not greater than 5 microns.

18. A phonograph record molding composition capable of producing molded products of a low cold flow rating below 20 millimeters composed of a moldable mass containing a resinous moldable material having a modulus of elasticity not greater than 6 and a compressive strength not greater than 19,000, and a finely divided lignocellulose filler the particles of which are not more than 30 microns in diameter, said moldable mass not having by itself the property of producing cold flow resistant molded products, in combination with about 1 to 10% of precipitated calcium silicate having a maximum average particle diameter of not greater than 5 microns.

JOSEPH W. AYERS.

REFERENCES CITED

The following references are of record in the file of this patent:

UNITED STATES PATENTS

| Number | Name | Date |
|---|---|---|
| 2,206,636 | Hunter | July 2, 1940 |
| 2,217,170 | Hunter | Oct. 8, 1940 |
| 2,269,267 | Hunter | Jan. 6, 1942 |
| 2,307,180 | Yngve | Jan. 5, 1943 |
| 2,319,182 | Van der Pyl | May 11, 1943 |
| 2,572,798 | Ayers | Oct. 23, 1951 |